United States Patent
Rooney et al.

(10) Patent No.: US 6,601,732 B1
(45) Date of Patent: Aug. 5, 2003

(54) BAG-IN-BOX PACKAGE COMPRISING A TAP AND/OR TAP FITTING CONSISTING OF A POLYMER COMPOSITION COMPRISING AN OXYGEN SCAVENGING MATERIAL

(75) Inventors: Michael Laurence Rooney, Lane Cove (AU); Mark Andrew Horsham, Mascot (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 09/486,108

(22) PCT Filed: Aug. 21, 1998

(86) PCT No.: PCT/AU98/00671

§ 371 (c)(1), (2), (4) Date: May 8, 2000

(87) PCT Pub. No.: WO99/10251

PCT Pub. Date: Mar. 4, 1999

(30) Foreign Application Priority Data

Aug. 21, 1997 (AU) .............................................. PO8684

(51) Int. Cl.[7] .............................................. B65D 35/00
(52) U.S. Cl. ...................... 222/107; 222/105; 428/35.2; 428/35.4
(58) Field of Search ................. 428/457, 458, 428/500, 515, 522, 483, 34.2, 34.8, 34.1, 35.7, 35.8, 36.6, 35.4, 35.2; 222/105, 107

(56) References Cited

U.S. PATENT DOCUMENTS

| 4,355,742 | A | * | 10/1982 | Scholle ........................ 222/490 |
| 5,310,497 | A | * | 5/1994 | Ve Speer et al. ........ 252/188.28 |
| 5,350,622 | A | * | 9/1994 | Speer et al. ................. 428/215 |
| 5,605,996 | A | * | 2/1997 | Chuu et al. ................. 526/340 |
| 5,744,056 | A | * | 4/1998 | Venkateshwaran et al. ...... 252/188.28 |
| 5,958,254 | A | * | 9/1999 | Rooney ...................... 210/757 |

FOREIGN PATENT DOCUMENTS

| WO | 94/12590 | 6/1994 |
| WO | 96/34070 | 10/1996 |
| WO | 98/05555 | 2/1998 |
| WO | 98/05571 | 2/1998 |

\* cited by examiner

*Primary Examiner*—Monique R. Jackson
(74) *Attorney, Agent, or Firm*—McDermott, Will & Emery

(57) ABSTRACT

Oxygen scavenging compositions comprising at least one reducible organic compound which is reduced under predetermined conditions, the reduced form of the compound being oxidisable by molecular oxygen, wherein the reduction and/or subsequent oxidation of the organic compound occurs independent of the presence of a transition metal catalyst. Uses for the above compounds provide a flexible packaging material, a carton, a bag-in-box package, a thermoformed tray, cup or tub, a resin for blow-moulding, an overwrap, shrinkwrap, tight label or coating, a closure liner and a can.

8 Claims, 5 Drawing Sheets

FIG. 1A
INITIAL STATE

FIG. 1B
TRIGGERED STATE

FIG. 1C
SCAVENGED STATE

— TRAY LIDDING FILM

BAG-IN-BOX PACKAGE COMPRISING A TAP AND/OR TAP FITTING CONSISTING OF A POLYMER COMPOSITION COMPRISING AN OXYGEN SCAVENGING MATERIAL

FIELD OF THE INVENTION

This invention relates to novel uses of the oxygen scavenging compositions described in the co-pending Australian patent application No. 55537/94. In particular, the invention relates to novel uses of oxygen scavenging compositions in packaging materials comprising a gas and vapour barrier-forming layer or coating.

BACKGROUND OF THE INVENTION

A wide variety of foods and other materials are susceptible to loss in quality during storage under atmospheric levels of oxygen. The damage can arise from chemical oxidation of the product, from microbial growth, and from attack by vermin—much of which may be avoided by reducing the oxygen availability in the environment of the materials. In the field of packaging, relatively low-oxygen atmospheres have traditionally been generated by vacuum packing and inert gas flushing. Such methods are not, however, generally applicable for various reasons. For example:

soft porous foods such as cakes cannot be subjected to strong vacuum:

fast filling speeds generally preclude substantial evacuation of, or thorough inert gas flushing of, food packages:

filling some gas-flushed containers, such as beer bottles often results in occlusion of air:

evacuation or flushing offers no residual capacity for removal of oxygen, which may have desorbed from the food or entered the package by leakage or permeation.

As a consequence there has been much interest in chemical techniques for generating low-oxygen atmospheres and deoxygenating liquid or semi-liquid foods.

In the abovementioned Australian patent application No. 55537/94 (the entire disclosure of which is incorporated herein by reference), the present applicants describe novel oxygen scavenging compositions which may be readily activated or "triggered" (ie. brought to their oxygen scavenging form) as required by exposure to predetermined conditions, for example, light of a certain intensity or wavelength (eg. UV) or by application of heat, γ-irradiation, corona discharge or an electron beam. These compositions (and packaging materials including the compositions) may therefore be stored under standard conditions, then triggered to the activated state just prior to use. The oxygen scavenging compositions, once activated, are capable of continuing to scavenge oxygen from an oxygenated atmosphere or liquid in substantial darkness for periods ranging from up to a few minutes or hours to over 100 days.

The novel oxygen scavenging compositions described in application No. 55537/94 are hereinafter referred to as "the oxygen scavenging compositions". These compositions comprise at least one reducible organic compound which is reduced and/or subsequently oxidised independently of each of constant illumination with visible light and the presence of a transition metal catalyst. The most preferred reducible organic compounds are quinones such as benzoquinone, anthraquinone (eg. 9,10-anthraquinone) and napthoquinone (eg. 1,4-napthoquinone): photoreducible dyes (e.g. methylene blue, azo, thiazine, indigoid and triarylmethane compounds): and carbonyl compounds which have absorbance in the UV spectrum particularly, when provided in a in polymerized. copolymerised, or oligomerised form.

In addition, the oxygen scavenging compositions described in application No. 55537/94 may include a scavenging component reactive to activated oxygen species (e.g. peroxide) which may be generated during the scavenging of molecular oxygen. Preferred examples of the activated oxygen scavenging component include antioxidants, amines, organic phosphines (e.g. triphenylphosphine) and organic phosphites (e.g. triphenylphosphite) and sulfur compounds such as thiols, thioethers and thioesters. Alternatively, the activated oxygen scavenging component may be embodied within the reducible organic compound itself, for example a quinone having an amine group.

Further, the compositions may include a source of labile hydrogen or electrons which may be abstracted by the reducible organic compound as it is brought to its activated state. Such sources of labile hydrogen or electrons include compounds such as the salts of sulfonic or carboxylic acids.

As described in application No. 55537/94, the at least one reducible organic compound, the activated oxygen scavenging component and/or the source of labile hydrogen or electrons may be in the form of a polymer, copolymer or oligomer, thereby providing an advantage of permitting the use of the oxygen scavenging compositions in the form of films (monolayer and multilayer) for a wide variety of applications. In multilayer laminate films, the at least one reducible organic compound and activated oxygen scavenging component may be provided in the same layer or in distinct layers.

The copolymerised form of the reducible organic compound is a copolymer of a monomer containing the reducible organic compound bound with one or more monomers which might be used in packaging polymers.

It is evident from the descriptions of vises in application No. 55537/94, that the oxygen scavenging compositions can be utilised in a wide variety of packaging materials and package forms. However, the applicants have now recognised further novel uses and modes of use for the oxygen scavenging compositions.

DISCLOSURE OF THE INVENTION

Thus, in a first aspect, the present invention provides a flexible packaging material comprising a film, co-extrusion or laminate comprising one or more layers of an oxygen scavenging composition(s) in combination with at least one gas and vapour barrier-forming layer or coating, wherein said oxygen scavenging composition(s) comprises at least one reducible organic compound which is reduced when the composition(s) is subjected to predetermined conditions, the reduced form of the organic compound(s) being oxidisable by ground state molecular oxygen, and wherein the reduction and/or subsequent oxidation of the organic compound (s) occurs independently of each of constant illumination with visible light and the presence of a transition metal catalyst.

Preferably, the said barrier-forming layer or coating is an oxygen barrier-forming layer or coating such as a film layer of a high oxygen barrier polymer (e.g. polyvinyl alcohol, ethylene vinyl alcohol copolymer and polyethylene naphthalate) which may also be coated with a further barrier polymer such as polyvinylidene chloride or its copolymers, or a coating of a substance selected from the group consisting of carbon (particularly in the crystalline form of diamond), aluminium, aluminium oxide, and oxides and nitrides of metals, including silicon oxides.

The one or more layers of the oxygen scavenging composition may be laminated or extrusion-coated onto a barrier-forming layer. Barrier-forming coatings may be applied directly to the surface of a layer of the oxygen scavenging composition or, for example, to a laminated film. Barrier-forming coatings may be applied by vacuum techniques which are well known to persons skilled in the art.

The innermost layer(s) comprising the oxygen scavenging composition ("the scavenger layer(s)") or another fusible layer or an adhesive layer, may be considered as forming "the sealant layer" of the packaging material. The flexible packaging material according to the first aspect may further comprise one or more layers of a solid packaging material such as aluminium foil or paper. Further, the oxygen scavenging composition may be blended or dispersed in one or more layers of the flexible packaging material. Where the oxygen scavenging composition includes an activated oxygen scavenging component, the at least one reducible organic compound and the activated oxygen scavenging component may be present in the same or distinct layers.

In use, the gas and vapour barrier-forming layer or coating will normally be present on the outside of the package relative to the scavenging layer facing the surrounding environment. The oxygen scavenging layer(s) are, therefore, normally adjacent to the package contents, although contact between the contents and the oxygen scavenging layer(s) may be avoided by providing a space within the package and/or by providing an inner, relatively high gas-permeable, heat seal (i.e. "sealant") layer or layers. Where an oxygen scavenging layer contacts the package contents, the oxygen scavenging layer would normally also be a sealant layer.

It may also be advantageous to provide the packaging material with an additional layer or layers to provide strength or other properties. Where thermoplastic, these additional layer(s) can be coextruded, extrusion laminated or adhesive laminated (see Example 1). The oxygen scavenging layer may be the tie layer in coextrusions or the adhesive layer (in which case it would include an adhesive agent or polymer) in adhesive laminations.

Preferably, the oxygen scavenging layer(s) may comprise a blend or mixture of the oxygen scavenging composition and a polymer(s) such as a polyolefin (e.g. polyethylene, polypropylene and copolymers thereof or copolymer of an olefin including modifying monomers such as acrylic acid or methacrylic acid and their esters and salts, or ethylene vinyl acetate copolymer and its terpolymers.

The concentration of the at least one reducible organic compound or, where polymerised, copolymerised or oligomerised, the reducible substituen (e.g. an anthraquinonyl group), may be varied to provide any required oxygen scavenging rate or capability to react with the quantity of oxygen expected to enter the package by leakage or permeation during its useful life. The concentration of the reducible organic compound or group will therefore vary between 0.01% and 99.9% (w/w) of the oxygen scavenging layer, preferably between 0.01% and 50% (w/w).

The laminates or coextrusions described above may be used in the production of liquid cartonboard for use in, for example, the manufacture of brick-shape and gable-topped cartons for liquids.

Thus, in a second aspect, the present invention provides a carton for liquids manufactured from liquid cartonboard comprising one or more layers of an oxygen scavenging composition(s) in combination with at least one gas and vapour barrier-forming layer or coating, wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

Such cartons may vary in capacity from 100 ml to 50 liters, preferably from 250 ml to 10 liters. The barrier-forming layer or coating is preferably an oxygen barrier-forming layer or coating and may be as described above in connection to the first aspect of the invention, but is preferably a layer of aluminium foil or a polymer that is metal-oxide coated, or is coated with polyvinylidene chloride or a vacuum-deposited coating of aluminium.

The cartons according to the second aspect of the invention may be particularly valuable in applications where the carton is to contain a headspace containing oxygen or where the liquid contents contain substantial dissolved oxygen.

Film forms of the packaging material of the first aspect may also be used to package liquids, for example, in a bag-in-box type package.

Thus, in a third aspect, the present invention provides a bag-in-box package for containing liquids including a bag comprising one or more film layers of an oxygen scavenging composition(s) in combination with at least one gas and vapour barrier-forming layer or coating, wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

The "box" in which the bag is contained may be any of the usual containers in which such bags are held commercially. These containers include fibreboard boxes, fibreboard cartons, fibreboard containers on pallets, timber or metal structures or drums. Paper or paperboard may also be used to make such containers as may plastics.

The bag included in the bag-in-box package may comprise one layer or two separate ("structural") film layers separated by a gas ("air") space and formed into a pouch or bag by sealing at the edges. Both single and duplex construction, which are well known to the art, provides a package which collapses readily as the liquid contents are withdrawn. In some embodiments, a fitting for a tap will be affixed to the bag so as to allow filling of the package, often under aseptic conditions, followed by later (progressive) dispensing after attachment of the tap itself. The tap and/or its fitting may be constructed of a plastic or other polymer composition containing the oxygen scavenging composition. This is particularly valuable since much of the oxygen ingress that occurs in present packages of this type takes place through the tap and its fittings.

Preferably, the barrier-forming layer or coating is an oxygen barrier-forming layer or coating.

The one or more film layers of the oxygen scavenging composition may be located closest to the liquid contents and/or may form one or more outer layers which are inside the bag relative to the barrier-forming layer. An additional film layer or layers of the oxygen scavenging composition may also be included between the structural layers of the bag. Where the oxygen scavenging composition includes an activated oxygen scavenging component, the reducible organic compound and the activated oxygen scavenging component may be present in distinct layers.

The capacity of bag-in-box packages according to the invention may be from 300 ml to 1.5 tonnes, preferably 375 ml to 1.5 tonnes. The volume of oxygen initially within the bag can range from 5 ml to 1 liter. The concentration of the reducible organic compound or, where polymerised, the reducible substituent, in the oxygen scavenging layer(s) and/or tap assembly may be varied to allow for removal of oxygen as it permeates the packaging material and/or as it leaks through the tap assembly and/or package seals.

In a fourth aspect, the present invention provides a thermoformed tray, cup or tub comprising an oxygen scavenging composition(s) in combination with at least one gas and vapour barrier-forming layer or coating, wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

The oxygen scavenging composition may be a polymer or copolymer, or otherwise dispersed in a polymer or copolymer, used to manufacture the tray, cup or tub. Alternatively or additionally, the oxygen scavenging composition may be present in a layer or layers of a multilayer thermoformed film or sheet used to thermoform the tray, cup or tub (see Example 2). Preferably, the oxygen scavenging layer(s) will be located closer to the insides of the tray, cup or tub than the barrier-forming layer. Again, the barrier-forming layer or coating is preferably an oxygen barrier-forming layer or coating. Also, where the oxygen scavenging composition includes an activated oxygen scavenging component, the reducible organic compound and the activated oxygen scavenging component may be present in distinct layers.

Additionally, the oxygen scavenging composition may be included in the layer of lidding film between the barrier-forming layer and the package contents. In this embodiment, the lidding film layer would usually be sealable to the opening of the container. Alternatively, the oxygen scavenging composition may form, be blended or otherwise incorporated into a layer between the barrier layer and a sealant layer. In this case, the scavenger layer may be an uncrosslinked plastic or may be a lacquer or adhesive formed, for example, following solvent evaporation, with or without chemical crosslinking, after application to the barrier-forming layer.

In a fifth aspect, the present invention provides a resin for blow-moulding containers such as bottles and jars, said resin comprising an oxygen scavenging composition(s), wherein said oxygen scavenging composition(s) comprise at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

Containers manufactured from the resin may be single layer, bilayer or multilayer and the resin would typically comprise, in addition to the oxygen scavenging composition, poly(ethylene terephthalate), PET, poly(ethylene naphthalate), PEN, or blends of these resins or as blends with other polymers such as aromatic polyamides.

The use of the oxygen scavenging composition(s) in monolayer bottles and jars is feasible because the oxygen barrier property of plastics like PET is sufficiently high as to minimise the depletion of the oxygen scavenger to that located near to the outside of the container.

For bilayer and multilayer containers, the resin comprising the oxygen scavenging composition may be used to produce the layer or layers which will be nearest to the contents. The concentration of the reducible organic compound or, where polymerised, the reducible substituent, will preferably exceed that required to initially deoxygenate the contents and any headspace in the container.

In a sixth aspect, the present invention provides an overwrap, shrinkwrap or tight label or coating for use on the outer surface of a container, said overwrap, shrinkwrap or tight label or coating comprising an oxygen scavenging composition(s), wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

Such an overwrap, shrinkwrap or tight label or coating may be useful for preventing oxygen from permeating a container. The oxygen scavenging composition may be used as the inner layer(s) or as an adhesive of, for instance, a shrink label on a bottle with the outer layer of the shrink label acting as a good oxygen barrier-forming layer. Such wraps or labels need not cover all of the outer surface of the container, depending upon the extent of oxygen permeation barrier required. Thus, the barrier material may be aluminium foil or any oxygen barrier-forming polymer but, preferably, is a polyvinylidene chloride-coated film, a polyamide or a polymer or copolymer of vinyl alcohol, PET or PEN. The barrier material may also include a layer of aluminium, a metal oxide or carbon, any of which may be deposited by a vacuum technique.

In use an overwrap may take the form of a "Masterpack" which forms a sealed bag or container around several packaged products. These products may be themselves already packaged in an oxygen permeable package so that oxygen released therein can be scavenged by an oxygen scavenging composition layer(s) located on the inside of a Masterpack barrier layer. The Masterpack would normally contain an inert gas atmosphere. Such a pack might be used for extending the shelf life of fresh meat that is already packaged for retail sale or trade use. Alternatively, a Masterpack with an inert gas atmosphere may be used to contain packages which already have a substantial barrier to oxygen but which leak oxygen or allow small amounts of permeation. An example of such a product would be multipacks of pharmaceutical preparations which are very oxygen sensitive.

In a further aspect, the present invention provides a closure liner comprising an oxygen scavenging composition(s), wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

Such a liner would normally cover most of the inner surface of the closure which contacts the opening of the container and its contents. Alternatively, the liner could be in the form of an annulus which contacts the opening of the container. Closure liners for oxygen scavenging may be made from any of the polymer or plastisol compositions normally used for such purposes. However, preferably, these polymers will be olefin polymers and copolymers with comonomers which improve properties such as resilience, softness and inertness to the package contents. Plastisols will preferably be made from vinyl chloride polymers and copolymers. Some closures are made from materials, such as plastics, which are partially permeable to oxygen from the air. In such cases it may be necessary to make the oxygen scavenging composition layer ail inner layer of a multilayer liner in which an oxygen barrier layer is disposed on the side contacting the closure. In this way the scavenging composition is not depleted in capacity by oxygen permeating the closure material.

In yet a still further aspect, the present invention provides a can container for foods and liquids, said can including a lacquer, enamel or other polymeric coating comprising an oxygen scavenging composition(s), wherein said oxygen scavenging composition(s) comprises at least one reducible organic compound which is reducers when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

The can container may be manufactured from aluminium, steel and tin-plated steel. The oxygen scavenging composition may be incorporated into the lacquer, enamel or coating by dispersion or blending or, alternatively, one or more of the components of the oxygen scavenging composition may become part of the covalently crosslinked structure if appropriate functional groups are included into their structure. For instance, compounds with the reducible group and containing one or more epoxy groups may be crosslinked into amine-epoxy coatings.

In the present applicant's further copending Australian patent application No. 54896/96 (the entire disclosure of which is incorporated herein by reference), materials comprising the oxygen scavenging compositions contained within oxygen impermeable compartment(s) or microcapsule(s) are described. The compartment(s) or microcapsule(s) of these materials may be broken or otherwise rendered oxygen permeable by application of heat, electromagnetic radiation, mechanical pressure or stress, or by hydration. Thus, these materials permit the oxygen scavenging composition to be "pre-triggered" to the activated state remote from the location at which the material is to be used. It is to be understood that, where appropriate, the oxygen scavenging composition(s) or layer(s) of oxygen scavenging composition(s) described in the packages, applications and products above, may be substituted by a similar oxygen scavenging composition which is in the form of a material as described in patent application No. 54896/96.

The terms "comprise", "comprises" and "comprising" as used throughout the specification are intended to refer to the inclusion of a stated component or feature of group of components of features with or without the inclusion of a further component or feature or group of components or features.

The invention is hereinafter described by way of the following non-limiting examples and with reference to the accompanying figures.

EXAMPLE 1

Figure 1A:
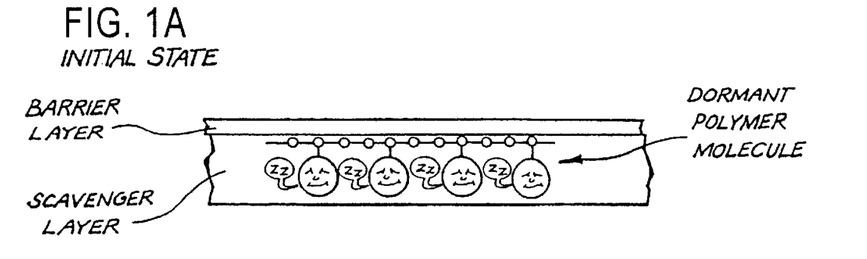
FIG. 1 provides a diagrammatic representation of the mechanism of oxygen scavenging achieved by packages utilising the oxygen scavenging compositions.
Figure 1B:
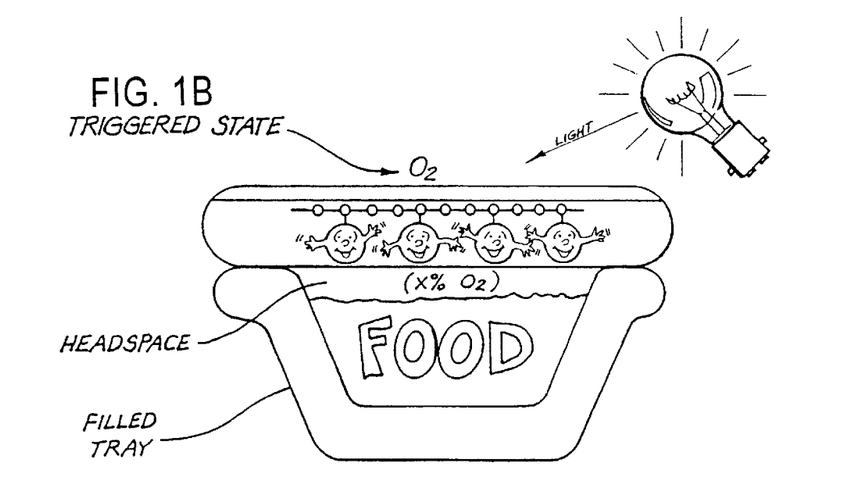
Figure 1C:
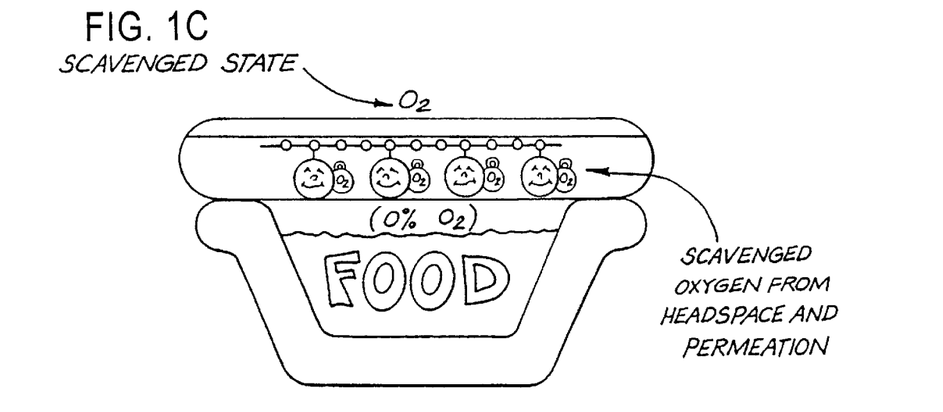
Figure 2:
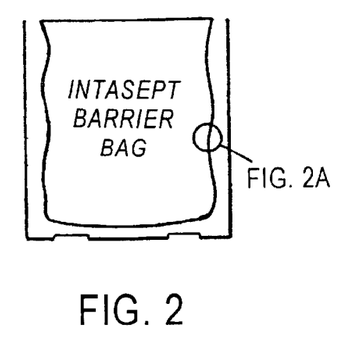
FIGS. 2 to 11 provide schematic representations of embodiments of the packages and applications according to the present invention.
Figure 2A:
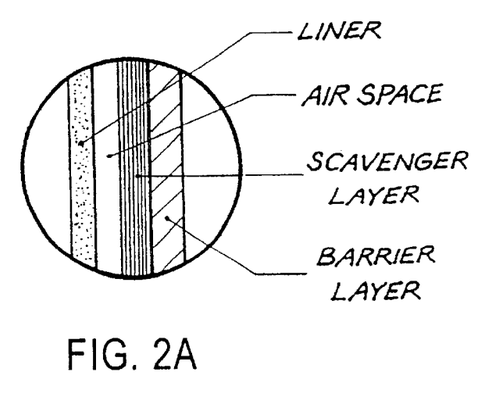
Figure 3:
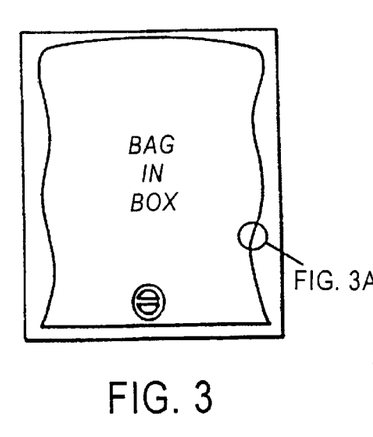
Figure 3A:
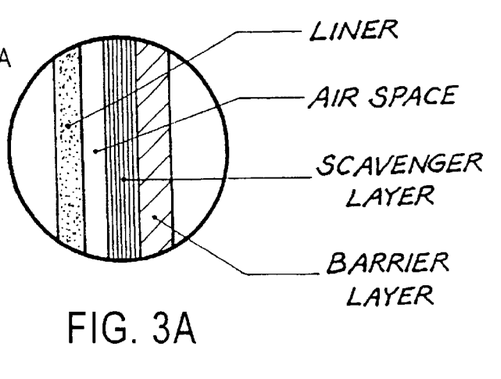
Figure 4:
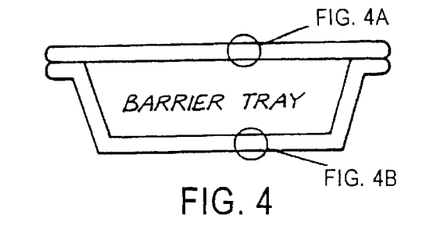
Figure 4A:
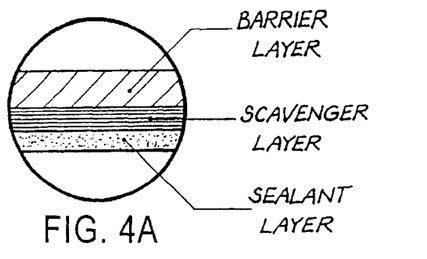
Figure 4B:
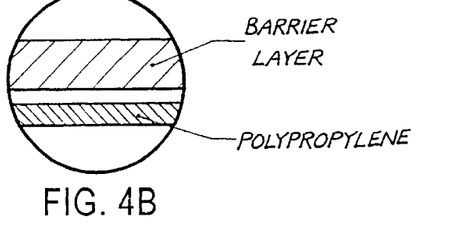
Figure 5:
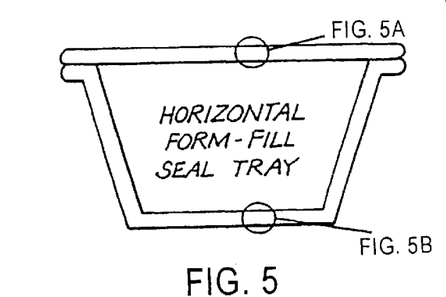
Figure 5A:
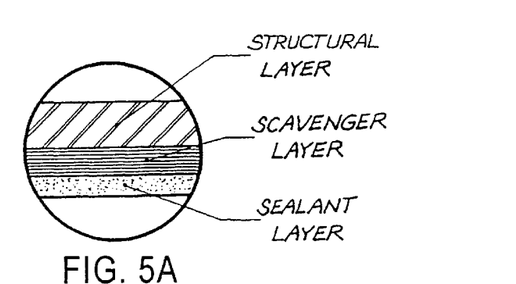
Figure 5B:
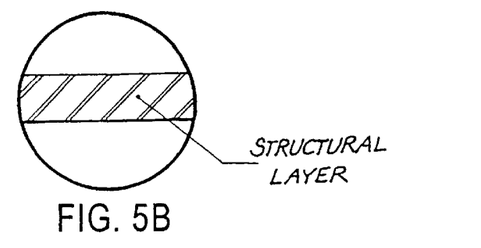
Figure 6:
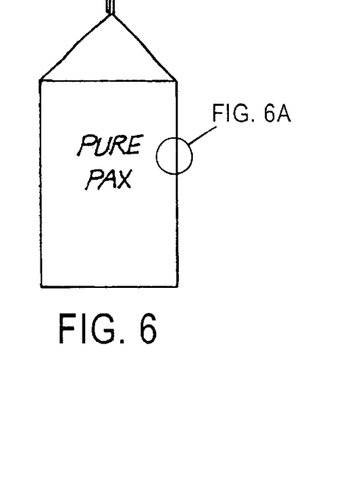
Figure 6A:
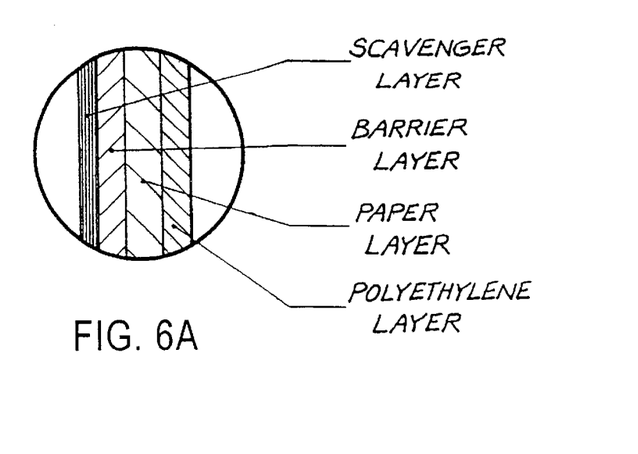
Figure 7:
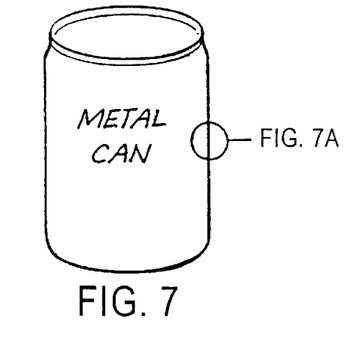
Figure 7A:
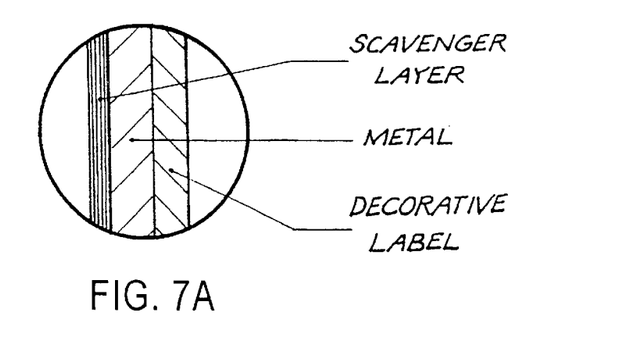
Figure 8:
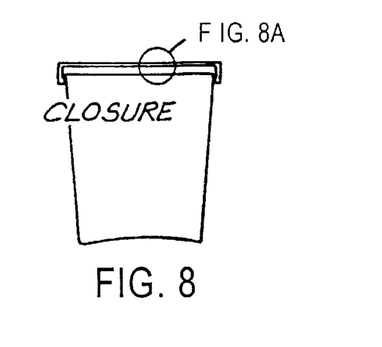
Figure 8A:
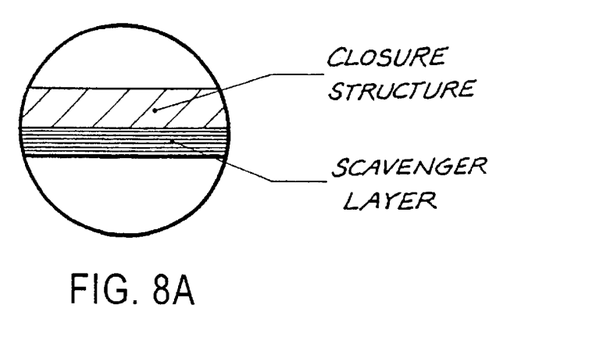
Figure 9:
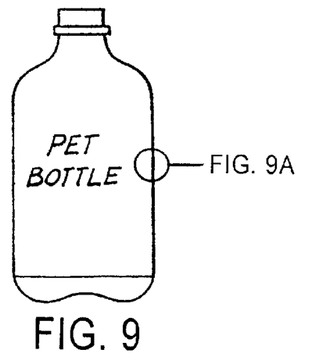
Figure 9A:
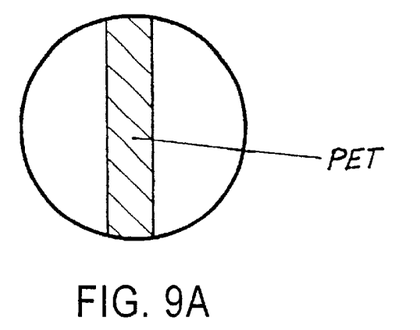
Figure 10:
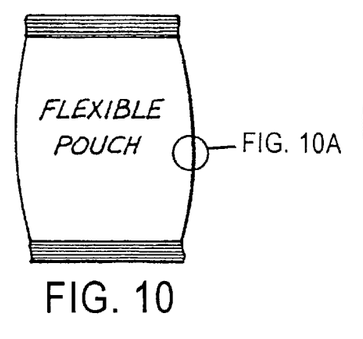
Figure 10A:
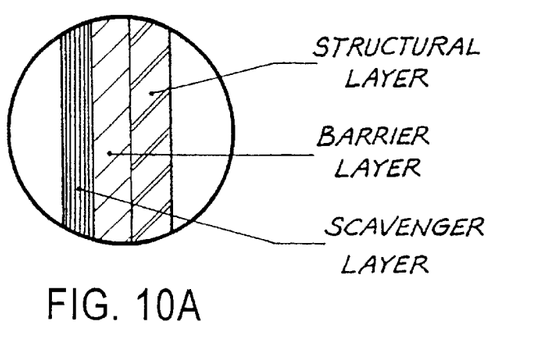
Figure 11:
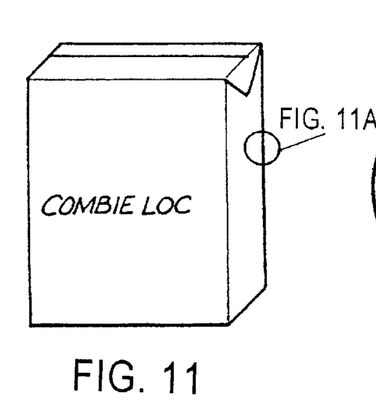
Figure 11A:
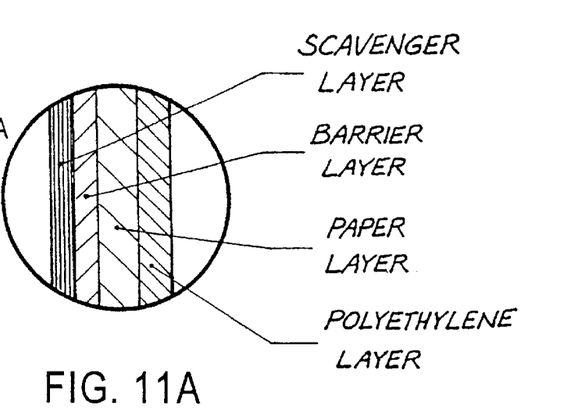

Oxygen Scavenging (OST) Applied to Flexible Pouches

An OST film consisted of a blend of a copolymer of ethylene with 9.10-anthraquinonyl-2-ethyl acrylate with an anthraquinone content of 18% m/m, and a copolymer of ethylene with dimethylaminopropyl acrylate (31.4 m/m) was produced as follows:

Synthesis of Copolymer of Ethylene and Dimethylaminopropylacrylate

Apparatus: 5L 4-necked flange flask, mechanical stirrer, Dean-Stark, Condenser, Nitrogen bleed and bubbler.

Lotryl 20MA08 (ATOCHEM, Paris, France, 500 g, nominally 20% w/w methyl acrylate units i.e. 1.16 mol) was first dissolved in refluxing toluene (2L). 3-Dimethylamino-1-propanol (200 ml. 1.62 mol) was then added followed by titanium isopropoxide (6 g) as catalyst. The reaction mixture was stirred at reflux for 16 hours with a steady stream of nitrogen over the surface of the reaction mixture. The reaction was monitored by $^1$H nmr. On completion of the reaction, the reaction mixture was diluted with toluene (2L) before precipitating from an acetone (10L) and toluene (2L) mixture. A fluffy white polymer was obtained which was collected by filtration and washed with acetone (6L). The polymer was air dried for 48 hours.

Synthesis of Copolymer, of Ethylene and 9,10-Anthraquinonyl 2-Ethyl Acrylate (a) Preparation of 2-(1-bromoethyl)-anthraquinone (BEAQ)

A mixture of 2-ethylanthraquinone (25 Kg, 105.9 mol), NBS (19.1 Kg, 107.3 mol) and benzoyl peroxide (70%, 200 g, 0.58 mol) in $CCl_4$ (~150L) is stirred at reflux for 1.5 hours. On cooling, the precipitate is collected by filtration and washed on the filter with ethanol, hot water and finally ethanol again. After drying, this may be used without further purification (i.e. recrystallisation from benzene/methanol (1:1)).

(b) Reaction of BEAQ with Primacor 3440

Primacor 3440 (Dow Chemical, USA, 20 Kg, containing 26.4 mol of carboxyl group) is first taken up in refluxing toluene (~120L) followed by the addition of 2-propanol (10L). On allowing the reaction to cool to about 80° C., DBU (4 Kg, 26.3 mol) is added. After stirring the reaction mixture for 0.5 h at reflux temperature, BEAQ (8 Kg, 25.4 mol) can be added in portions. The progress of the reaction can be followed by tlc analysis (10% EtOAc in Pet.Ether). The reaction is stirred at reflux for 2 h., or until no BEAQ can be detected by tic analysis. Acetic acid (7L) is then added, before pouring the reaction mixture onto acetone (200L). The polymer is collected by filtration and washed thoroughly on the filter with acetone, water and finally acetone again.

OST film (25 $\mu$m thick) was extruded using a single screw 1 inch extruder with an 35 cm wide slit die onto a PE/EVAL/PE coextrusion substrate. The resulting structure was made into pouches with the OST layer on the inside and separated by a piece of polypropylene film. The pouches had an internal surface area of 700 $cm^2$, and the weight of OST film used was 1.6 grams. After vacuum sealing, the pouches were irradiated in a commercial UV-curing system emitting at 300 W/inch (Fusion Systems, Maryland, USA) at a conveyor web speed of 10.5 m/min. 10 passes per side of the pouch. One of the pouches had 10 ml oxygen and 490 ml nitrogen injected (Pack 1), and the other 15 ml of oxygen and 735 ml nitrogen injected (Pack 2). Pouches were stored in darkness at 25° C.

The oxygen content of the pouch headspaces was determined periodically by gas chromatography and the results are shown in Table 1.

TABLE 1

Headspace oxygen in Pouches made using an OST extrusion coating

| | Pack 1 | | Pack 2 | |
|---|---|---|---|---|
| Time (hr) | % oxygen | oxygen consumed (mls) | % oxygen | oxygen consumed (mls) |
| 0 | 2.1 | 0 | 2.29 | 0 |
| 20 | 1.49 | 3.1 | — | — |
| 24 | — | — | 1.88 | 3.13 |
| 48 | 1.29 | 2.59 | — | — |
| 72 | — | — | 1.64 | 4.91 |
| 93 | 1.04 | 5.36 | — | — |
| 144 | — | — | 1.55 | 5.61 |
| 168 | 0.93 | 5.85 | — | — |

EXAMPLE 2

Oxygen Scavenging (OST) Applied to Modified Atmosphere Packed Fresh Pasta

Laminates comprising the OST film consisted of a web of Barex/OST film/EVA and were formed by heat pressing under pressure. Barex is manufactured by BP Chemicals Ltd. The laminates were then thermoformed into the mould of a Nu-Wave-200 tray Southcorp Packaging, Clayton, Victoria, Australia). Trays were sealed with a lid that consisted of EVOH/OST film/EVA that were formed by heat pressing.

The surface area of a tray was 290 cm$^2$, the thickness of OST film was 90 μm. The OST film consisted of a blend of a copolymer of ethylene with 9,10-anthraquinonyl-2-ethyl acrylate with an anthraquinone content of 18% m/m, and a copolymer of ethylene with dimethylaminopropyl acrylate (31.4 m/m). The trays and lids were then put into pouches made from a PE/EVAL/PE coextrusion. These were vacuum packed and were irradiated in a commercial UV-curing system emitting 300 W/inch (Fusion Systems, Maryland, USA) at a conveyor web speed of 12.6 m/min, 10 times per side.

Trays and lids were removed from their pouches, and trays were filled with 100 grams of fresh pasta, or glass beads (0.5 cm diameter). These were then gas flushed with a mixture of 65% $CO_2$, 2% oxygen, 33% nitrogen. The headspace was 200 ml.

Trays were analysed by GC for their gas composition and were stored in darkness at 25° C. Controls were handled as above, however they did not contain OST film. The gas analyses over a storage time at 25° C. are shown in Table 2.

TABLE 2

Headspace $O_2$ in OST film trays containing fresh pasta and glass beads

| Time (hr) | OP1 % O2 | OP2 % O2 | O + Glass Beads % O2 | C1 % O2 | C2 + Glass Beads % O2 | C3 + Glass Beads % O2 |
|---|---|---|---|---|---|---|
| 0 | 2.81 | 2.31 | 1.51 | 5.95 | 2.25 | 2.77 |
| 25 | | 1.44 | | 6.42 | | |
| 47 | | | | | | |
| 48 | | 1.12 | | 6.46 | | |
| 72 | 0.96 | 0.78 | 0.41 | | | |
| 95 | 0.73 | | 0.41 | | | |
| 141 | 0.51 | | | | 2.01 | 1.8 |
| 190 | | | | | | |
| 192 | | | | | | |
| 213 | | 0.18 | | | | |
| 240 | | | | | | |
| 282 | 0.21 | | | | | |
| 360 | | | | 6.11 | | | note: 'Indicates the trays with OST film. 'P' represents trays containing pasta. 'C' represents control trays From these results, it can be seen that oxygen is scavenged in trays made using OST film more rapidly than in its absence.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A bag-in-box package for containing liquids including a bag comprising one or more film layers of an oxygen scavenging composition(s) in combination with at least one gas and vapour barrier-forming layer or coating and a tap and tap fitting affixed to said bag, said tap and/or tap fitting consisting of a polymer composition comprising an oxygen scavenging composition(s), wherein said oxygen scavenging composition(s) comprises at least one reducible organic compound which is reduced when the composition is subjected to predetermined conditions, the reduced form of the organic compound(s) being oxidisable by ground state molecular oxygen, and wherein the reduction and/or subsequent oxidation of the organic compound(s) occurs independently of each of constant illumination with visible light and the presence of a transition metal catalyst.

2. A bag-in-box package according to claim 1, wherein the said barrier-forming layer or coating is an oxygen barrier-forming layer or coating.

3. A bag-in-box package according to claim 1, wherein the at least one reducible organic compound is selected from the group consisting of benzoquinone, anthraquinone and napthoquinone.

4. A bag-in-box package according to claim 1, wherein the at least one reducible organic compound is selected from the group consisting of 9,10-anthraquinone and 1,4-napthoquinone.

5. A bag-in-box package according to claim 1, wherein the at least one reducible organic compound is in a polymerised, copolymerised or oligomerised form.

6. A bag-in-box package according to claim 1, wherein the oxygen scavenging composition further comprises an activated oxygen scavenging component.

7. A bag-in-box package according to claim 6, wherein the activated oxygen scavenging component is selected from the group consisting of antioxidants, amines, organic phosphines, organic phosphites and sulfur-containing compounds.

8. A bag-in-box package according to claim 1, wherein the oxygen scavenging composition further comprises a source of labile hydrogen or electrons.

* * * * *